United States Patent [19]

Stinnett

[11] 4,132,263
[45] Jan. 2, 1979

[54] COMBINED HOUSEHOLD HEATING AND COOLING UNIT FOR AIR AND WATER

[76] Inventor: M. Wayne Stinnett, 4065 Sunrise Farms Rd., Middleburg, Fla. 32068

[21] Appl. No.: 800,713

[22] Filed: May 26, 1977

[51] Int. Cl.² .............................................. F25B 29/00
[52] U.S. Cl. .................................... 165/48 R; 165/45; 165/DIG. 2; 122/20 B; 126/121; 237/51; 237/55
[58] Field of Search ................... 165/DIG. 2, 45, 48; 237/51, 55; 126/121; 122/20 B

[56] References Cited

U.S. PATENT DOCUMENTS

| | | | |
|---|---|---|---|
| 1,867,975 | 7/1932 | Kilbourn et al. | 165/45 |
| 2,291,985 | 8/1942 | Powers | 165/DIG. 2 |
| 4,008,707 | 2/1977 | Bartlett | 126/121 |
| 4,049,194 | 9/1977 | Tice et al. | 126/121 X |
| 4,050,626 | 9/1977 | Awalt | 126/121 X |

Primary Examiner—Charles J. Myhre
Assistant Examiner—Margaret A. Latulip
Attorney, Agent, or Firm—Lamont Johnston

[57] ABSTRACT

A fireplace heating and cooling system is disclosed which heats air in a forced air heating system and heats water for a circulating hot water heating system or for hot tap water when combustion occurs in the fireplace and alternately will cool the air in a central, forced air system by circulating water cooled by a heat sink, through heat exchangers. A water reservoir is mounted on top of a fireplace firebox, having a central passage formed therethrough communicating with the throat of the firebox for absorbing heat from the combustion gases to heat water stored in the reservoir. A valve means selectively connects the water reservoir to a pressurized water supply, with an outlet to a circulating hot water heating system or to hot water taps. An air plenum is formed around the reservoir for circulating air from the ambient, across the reservoir to transfer heat between the water and the air. A heat exchanging element is connected to a heat sink such as subterranean soil, through which water is circulated by means of a pump and is selectively connected by the valve means to the water reservoir. After combustion has occurred in the fireplace, air can be warmed in the plenum for space heating and the water in the reservoir can be warmed for circulating hot water heating or for hot tap water when the valve means connects the pressurized water supply to the reservoir. Alternately, air can be cooled by circulating it through the plenum when the valve means connects the reservoir to the water circulating through the heat sink. In this manner, the system which is used as a heater in conjunction with the fireplace in the winter time, may also be used as an air conditioning cooler in the summertime.

8 Claims, 7 Drawing Figures

SEC A-A'

COMBINED HOUSEHOLD HEATING AND COOLING UNIT FOR AIR AND WATER

FIELD OF THE INVENTION

The invention disclosed is generally directed to fireplace heaters and more particularly is directed to a fireplace heating and cooling system.

BACKGROUND OF THE INVENTION:

The fireplace has served as the principal source of heat for the household prior to the 20th century. However, fireplaces heretofore have heated principally by radiative heating and over 80% of the heat value of the fuel combusted therein is wasted in the form of cumbustion gases which are conducted out of the throat of the firebox before their heat content can be usefully extracted. The 20th century has seen the fireplace, as an effective heating means, cast aside in favor of more efficient centralized heating systems burning fuels such as natural gas, oil, coal or electricity. Although the operational fireplace has been retained in the design of many homes being built today, it serves principally as an ornament, being only occasionally used.

However, with the onset of a world wide scarcity in the fuels used in centralized heating systems, the public interest is renewed in making use of the fireplace as a functional element in the heating of the home. New designs are now being sought to improve the efficiency of the fireplace as a heating plant.

In its long history of existence, many improvements have been attempted to increase the heating efficiency of the fireplace. For example, cumbersome superstructures have been developed which employ air convection principles to circulate air about the firebox and back into the ambient. These prior art structures are characterized by their inefficient extraction of heat from the firebox due principally to the interception of the radiant heat in the back and sides of the firebox. Other approaches to improving the efficiency of the conventional fireplace include the use of a small, roll-about heat exchanger assembly which can be rolled into the firebox and attached to a source of forced air. This type of heat exchanger apparatus fails to optimumly extract heat from the combustion gases since it does not take advantage of the substantial amount of heat conducted through the throat and up the flue.

Another problem with the fireplace in the prior art, which has been generally ignored, is that the equipment of the fireplace generally lies idle during the spring, summer and fall months, only being brought into use during the winter when heating is required. Centralized cooling systems used in the warmer months are generally expensive, specialized units being totally unrelated to the idle fireplace equipment.

OBJECTS OF THE INVENTION

It is an object of the invention to provide a fireplace heater which extracts the heat from the combustion gases passing through the throat of the fireplace.

It is another object of the invention to provide a fireplace heater which efficiently heats both air and water.

It is still another object of the invention to provide a fireplace heating system which will also cool the air in the summertime.

SUMMARY OF THE INVENTION

These and other objects, features and advantages of the invention are accomplished by the combined household heating and cooling unit for air and water disclosed herein.

A fireplace heating and cooling system is disclosed which heats air in a forced air heating system and heats water for a circulating hot water heating system or for hot tap water when combustion occurs in the fireplace and alternately will cool the air in a central, forced air system by circulating water cooled by a heat sink, through heat exchangers. A water reservoir is mounted on top of a fireplace firebox, having a central passage formed therethrough communicating with the throat of the firebox for absorbing heat from the combustion gases to heat water stored in the reservoir. A valve means selectively connects the water reservoir to a pressurized water supply, with an outlet to a circulating hot water heating system or to hot water taps. An air plenum is formed around the reservoir for circulating air from the ambient, across the reservoir to transfer heat between the water and the air. A heat exchanging element is connected to a heat sink such as subterranean soil, through which water is circulated by means of a pump and is selectively connected by the valve means to the water reservoir. After combustion has occurred in the fireplace, air can be warmed in the plenum for space heating and the water in the reservoir can be warmed for circulating hot water heating or for hot tap water when the valve means connects the pressurized water supply to the reservoir. Alternately, air can be cooled by circulating it through the plenum when the valve means connects the reservoir to the water circulating through the heat sink. In this manner, the system which is used as a heater in conjunction with the fireplace in the winter time, may also be used as an air conditioning cooler in the summertime.

DESCRIPTION OF THE FIGURES

These and other objects, features and advantages of the invention will be more fully appreciated with reference to the accompanying figures.

DISCUSSION OF THE PREFERRED EMBODIMENT

Figure 1:
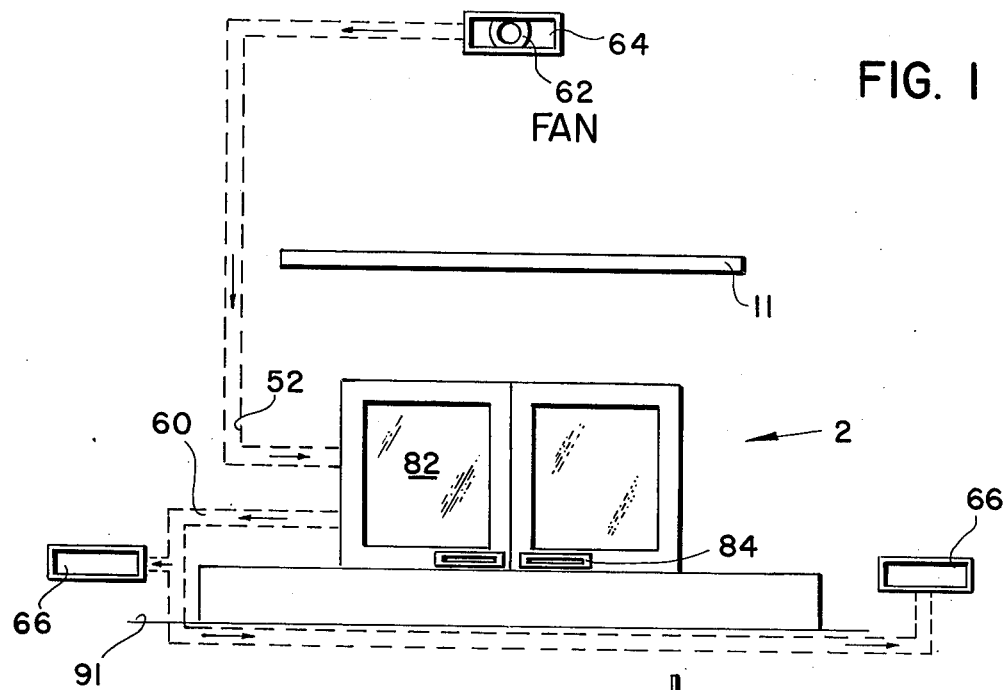
FIG. 1 is a frontal view of the fireplace heating and cooling invention.
Figure 2:
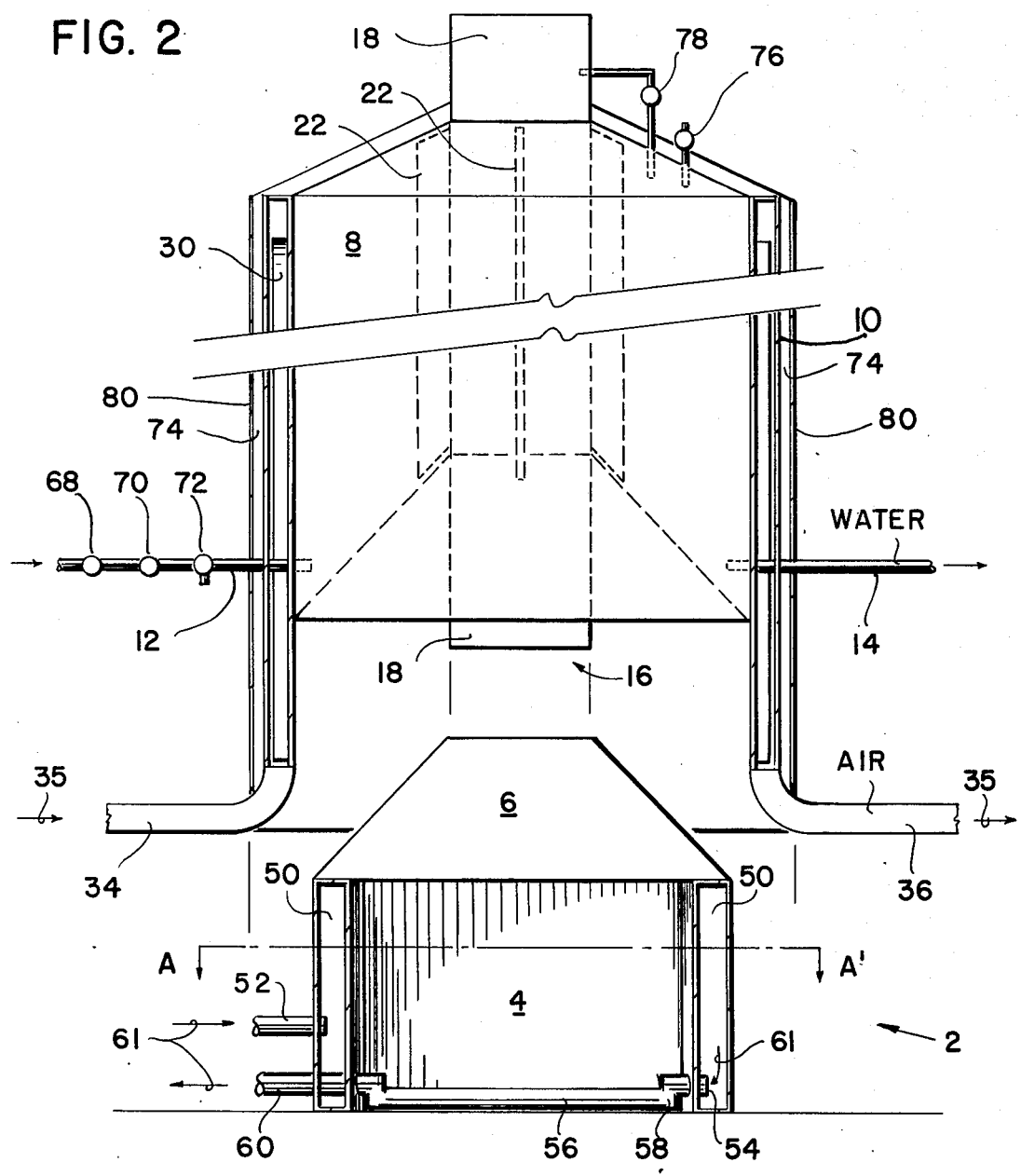
FIG. 2 is a cross sectional, break-away, exploded, frontal view of the invention of FIG. 1.

The fireplace heating and cooling system is generally shown in the frontal view of FIG. 1 and a more detailed view of the various elements of the invention are shown in the break-away drawing of FIG. 2. The fireplace heating and cooling system comprises a firebox 2 which has a mouth 4 for the introduction of fuel and a throat 6 for the exhaustion of combustion gases. A water reservoir 8, shown in FIG. 2, is mounted on top of the firebox 2 and is formed out of an external metal wall 10 through which is mounted a water inlet 12 and a water outlet 14. The water reservoir 8 has a central passage 16, shown in more detail in FIG. 3, which is formed by an interior metal wall 18 of the water reservoir 8. The central passage 16 connects the throat 6 of the firebox 2 to the chimney.

Figure 3:
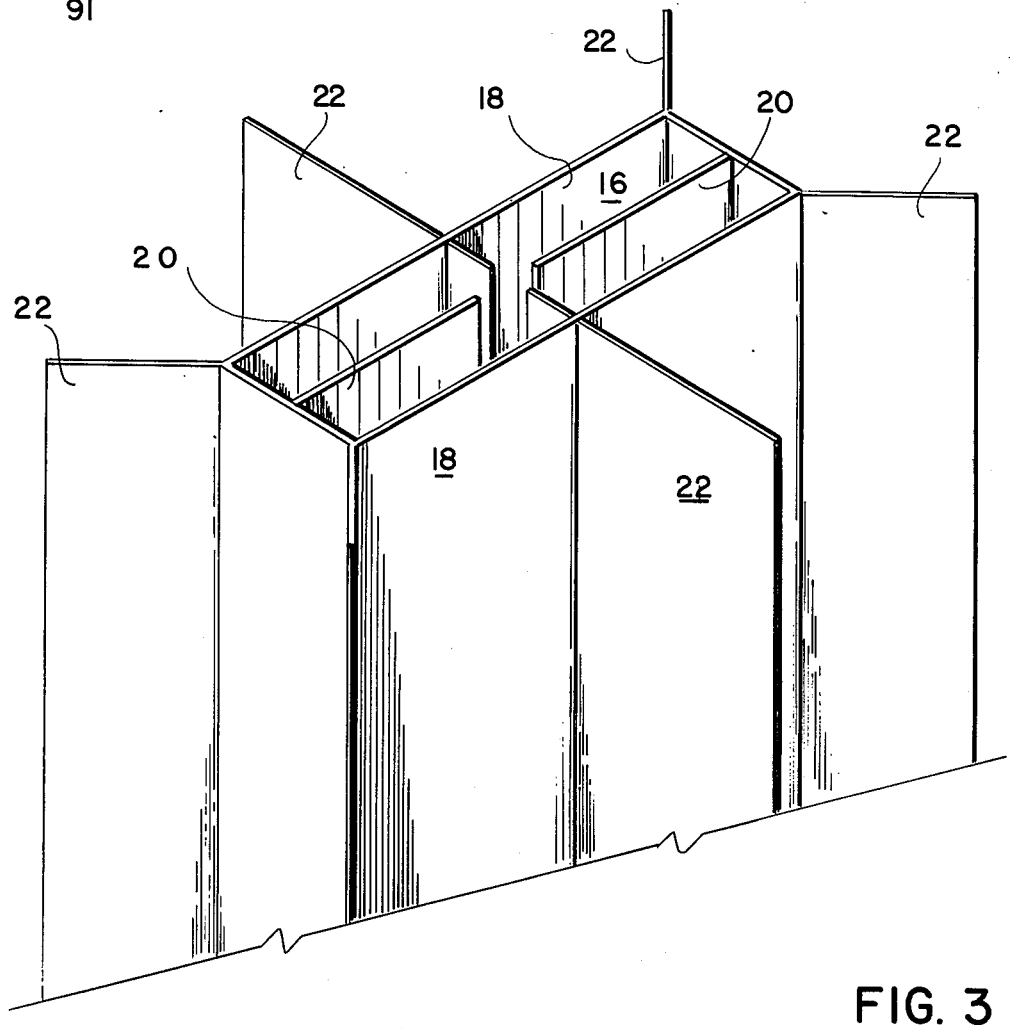
FIG. 3 is a detailed view of the central passage through the water reservoir showing the first and second heat exchanger elements.

The central passage 16 of the water reservoir 8 is generally rectangular in cross section, as is seen in FIG. 3, and has mounted on the interior wall 18 thereof a first set of heat exchanging elements 20 in the shape of fins which project out into the central passage 16 to absorb heat from the combustion gases passing up the throat 6 from the firebox 2. The second set of exchanging elements 22 in the shape of fins are mounted on the interior wall 18 within the reservoir 8 so as to be immersed in the water stored therein, for transferring the heat absorbed by the first heat exchanging elements 20, to the water stored in the reservoir.

Figure 7:
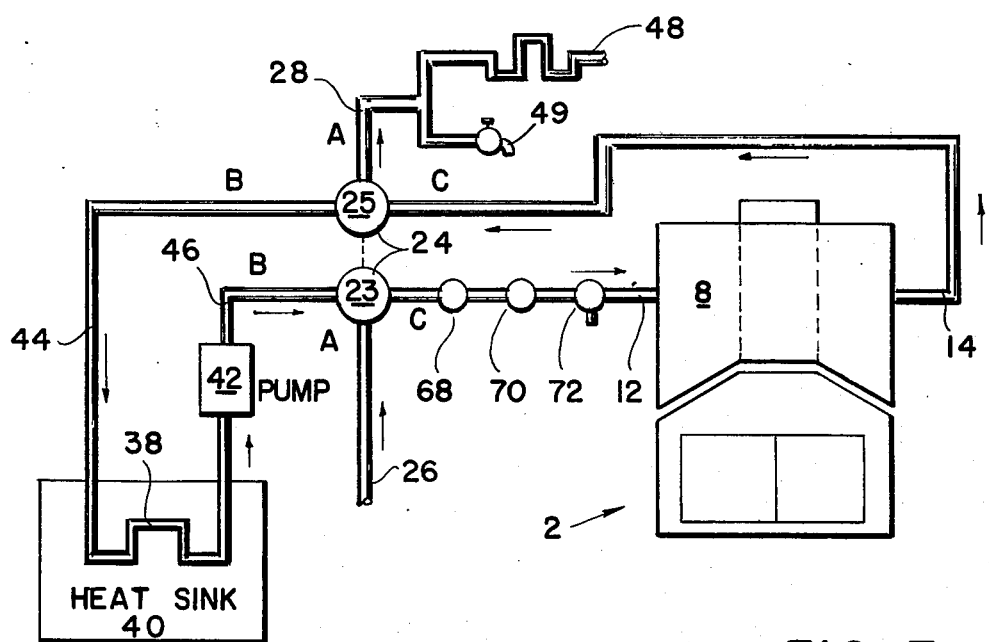
FIG. 7 is a schematic representation of the water circulating system for the invention.

FIG. 7 is a schematic diagram of the water circulation system for the invention. A valve means 24, shown schematically in FIG. 7, may be a conventional compound valve having 2 separate flow switching chambers, each chamber having a first port C which can be selectively connected to a second port A or alternately to a third port B, with the first and second chambers being simultaneously connected to either their respective port A or B, in unison. The valve means 24, shown schematically in FIG. 7, has its port C of its first chamber 23 connected to the water inlet 12 of the water reservoir 8 and its port A of its first chamber 23 connected to a pressurized water supply 26. The valve means 24 has the port C of its second chamber 25 connected to the water outlet 14 of the water reservoir 8 and its port A of the second chamber 25 connected to a hot water outlet 28 which may be a hot water heat radiator 48 or household hot water taps 49.

Figure 4:
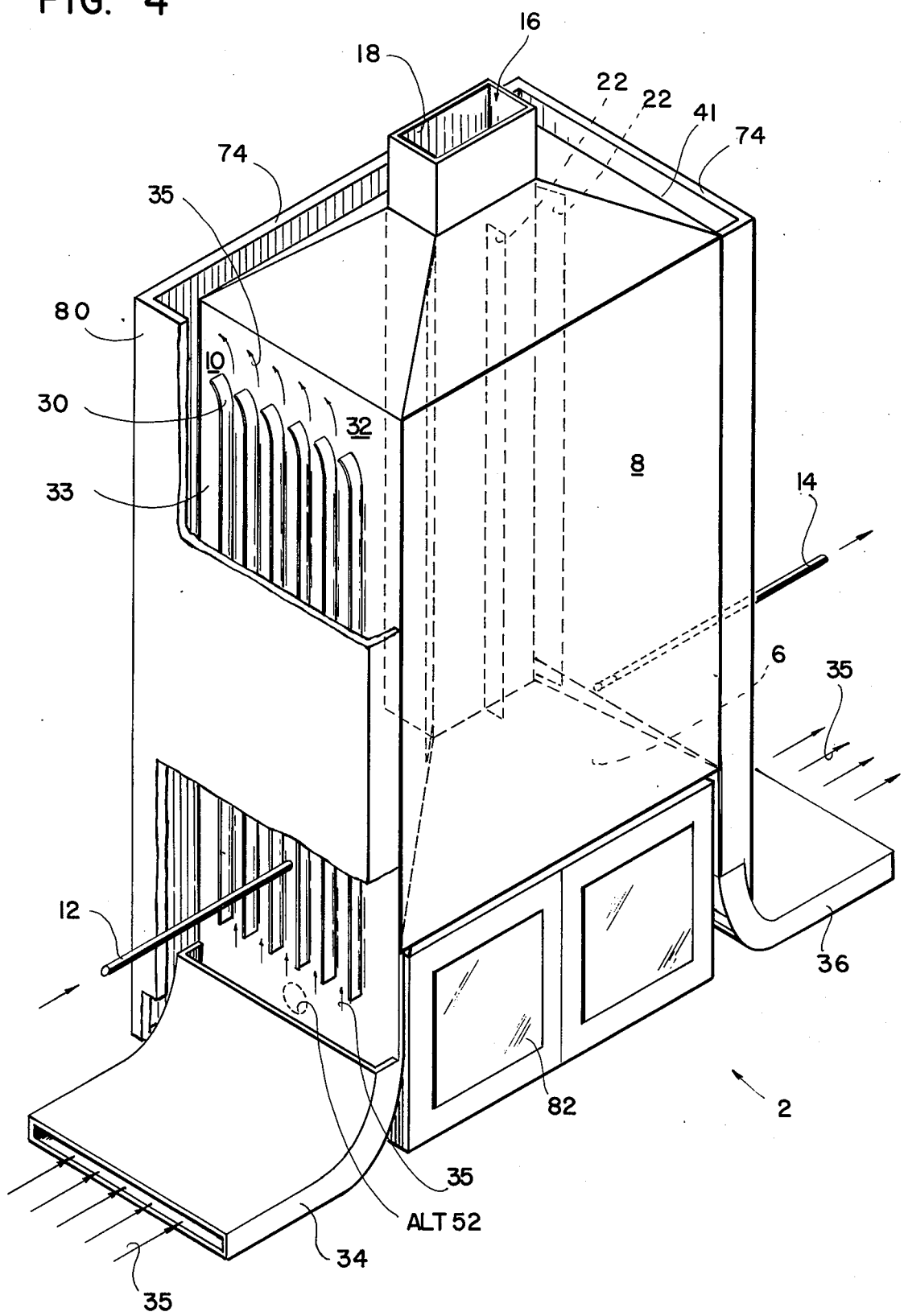
FIG. 4 is an isometric view of the air plenum surrounding the water reservoir.

The water reservoir 8 has a third set of heat exchanger elements 30 in the shape of fins, shown in FIG. 4, mounted on the outside surface of the external wall 10 of the water reservoir 8.

Figure 5:
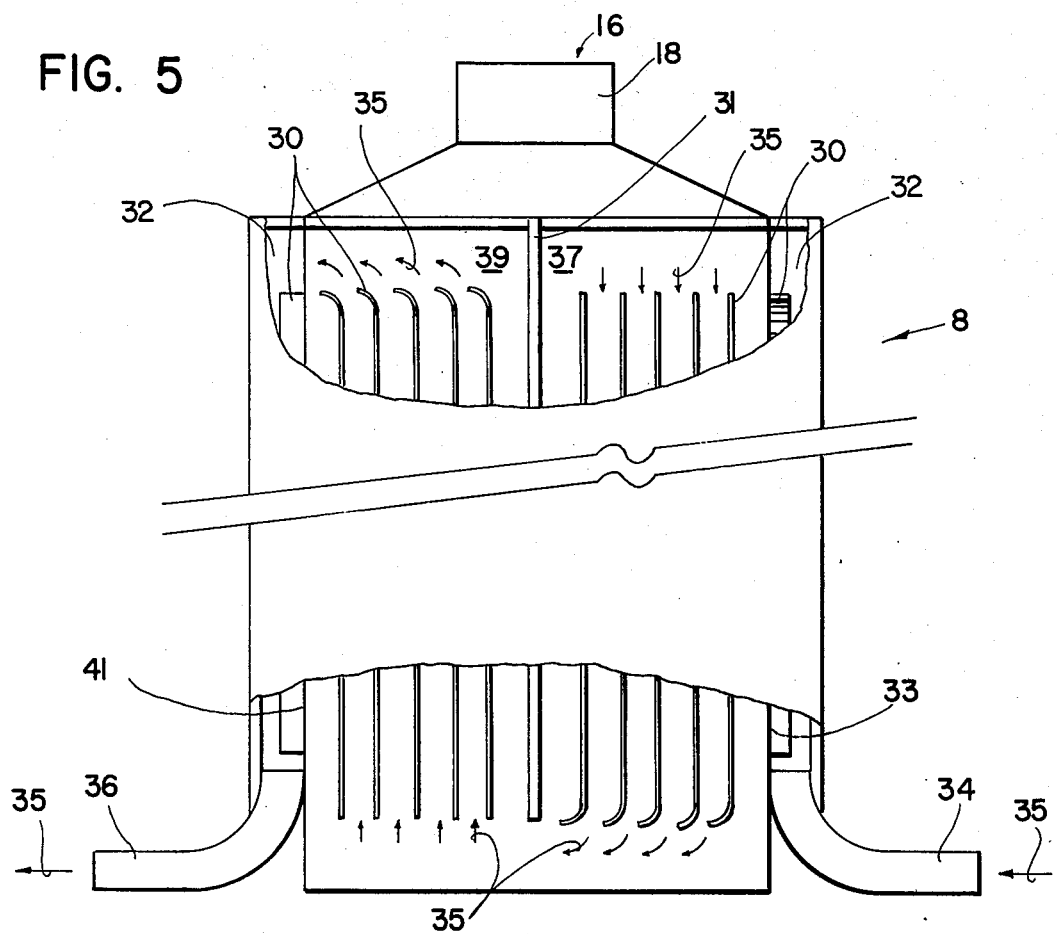
FIG. 5 is a rear view of the plenum shown in FIG. 4.

FIG. 4 shows an isometric view and FIG. 5 shows a rear view of the air plenum 32 which is formed around the external wall 10 of the water reservoir 8. The air plenum 32 has an air inlet 34 connected to a source of naturally convecting air or forced air, for example, in a central, forced air circulating system. The air plenum 32 has an air outlet 36 connected to a source of naturally convecting air or to the forced air system. Both the air inlet 34 and the air outlet 36 may alternately be connected to an air space whose temperature is to be maintained, such as the living space in a home or commercial building. The air plenum 32 conducts air introduced through the air inlet 34, across the third set of heat exchanging elements 30. After the air has been conducted across the heat exchanging elements 30, it is directed out of the plenum through the air outlet 36. An example of an efficient flow of the air so as to exchange a maximum amount of heat with the heat exchanger elements 30 is that shown by the arrows 35 in FIGS. 4 and 5 where, in FIG. 4, the air 35 is directed through the inlet 34 and up the right hand side 33 of the plenum 32 and then directed by heat exchange elements 30 toward the back side of the plenum as is shown in FIG. 5. The air 35 is then directed downwardly in a first half 37 of the back side of the plenum 32, shown in FIG. 5, so that after the air 35 reaches the bottom of the back side of the plenum 32, it is directed upwardly through the second half 39 of the back side of the plenum 32. After reaching the top of the second half 39 at the back side of the plenum 32, the air 35 is then directed to the left side 41 (as the observer faces the front of the fireplace in FIG. 4) where the air is again directed downwardly through the plenum 32 over additional heat exchanger elements 30, so as to finally exit through the air outlet 36. This air flow arrangement provided by the plenum 32 and the heat exchanger elements 30 provides for a maximum heat exchange efficiency between the water contained in the reservoir 8 and the air 35 flowing through the plenum. The fan in the central heating and cooling system connected to the air inlet 34 and the air outlet 36 may be thermostatically controlled.

FIG. 7 shows schematically, a fourth heat exchanging element 38 which is a water circulating coil in thermal contact with a heat sink such as a subterranean bulk of soil or water in a subterranean well. A pump 42 is connected in series with the circulating water coil 38 to drive water through the coil so as to exchange heat between the water within the coil 38 and the heat sink 40. The coil 38 has a water inlet 44 and the pump 42, connected to the coil, has a water outlet 46.

The valve means 24, shown in FIG. 7, has its port B for its first chamber 23 connected to the water outlet 46 for the pump 42 and has its port B for its second chamber 25 connected to the water inlet 44 of the water coil 38.

In operation, the air 35 in the plenum 32 is warmed from heat being transferred by the heat exchanging element 30 from the water within the water reservoir 8 to the air 35 after combustion has occurred in the firebox, transferring heat from the combustion gases in a central passage 16 through the heat exchanger elements 20 and 22 to the water stored in the water reservoir 8. The pressurized water 26 warmed in the water reservoir 8 after combustion has occurred in the firebox, supplies hot water to the hot water outlet 28 if the valve means 24 is in its first position A.

In the warmer seasons when household cooling is desired instead of household heating, the valve means 24 can be set at the position B connecting the heat exchanger coil 38 in the heat sink 40 to the water reservoir 8. With the pump 42 operating to circulate the water within the heat exchanger coil 38 through the water reservoir 8, the temperature of the water contained in the water reservoir 8 is reduced. Thus, as air 35 is driven through the plenum 32 over the heat exchanger elements 30, heat is extracted from the air and absorbed by the water in the water reservoir 8, thereby cooling the air for distribution within the household central air circulating system. No combustion will, of course, be occurring in the firebox during this period. The pump 42 connected to the water circulating coils 38 may be thermostatically controlled.

Figure 6:
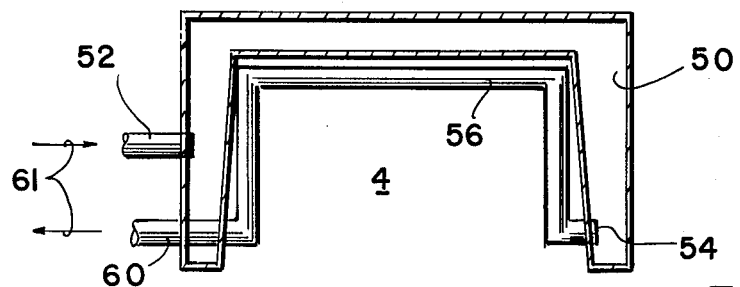
FIG. 6 is a top cross sectional view along A-A' of the firebox of FIG. 2, illustrating the air grate.

FIG. 6 illustrates an additional technique for extracting heat from a fire in the firebox 2, by employing a second plenum 50 surrounding the firebox 2 having an air inlet 52 connected to the ambient and an air outlet 54. An air grate 56 in the mouth 4 of the firebox 2 has an air inlet 58 connected to the air outlet 54 of the firebox plenum 50 and an air outlet 60 connected to the ambient. Air 61 is circulated through the second plenum 50 and air grate 56 by means of simple convection or forced air circulation, and is heated by conductive and radiative heating and then is returned to the ambient to heat the living space in the household. The second plenum 50 and air grate 56 may be an independent heating element from that represented by the water reservoir 8 and first plenum 32 or alternately it may be combined as an auxillary heat source with the water reservoir 8 and first plenum 32.

FIG. 1 illustrates how the second plenum 50 and air grate 56 may be employed as an independent heat source. An electric fan 62 mounted in the air inlet 64 draws air from the vicinity near the ceiling of the room where the fireplace is located and directs that air down to the air inlet 52 of the second plenum 50, located behind the mantle 11. After the air 61 has been heated by circulating through the second plenum 50 and the air grate 56, it is directed out of the air outlet 60 of the air grate 56 to the hot air outlet 66 near the floor level 91 of the room to be heated, as shown in FIG. 1.

In an alternate embodiment, the air inlet port 52 of the second plenum 50 may be connected to the air inlet port 34 of the first plenum 32 as shown in FIG. 4 and the air outlet port 60 of the air grate 56 may be connected to the air outlet port 36 of the first plenum 32 so that the second plenum 50 and air grate 56 may serve as an auxillary heating source in parallel with the first plenum 32, for heating the air 35 flowing from the air inlet port 34 of the air outlet port 36.

The fan 62 located at the air inlet 64 of FIG. 1, may be thermostatically controlled for forced air heating of the ambient. The air grate 56 may be constructed so as to be removed from the mouth of the fireplace 4 for easy cleaning. The air inlet 64 of FIG. 1, being located at ceiling level, greatly increases the efficiency of heating by taking hotter air at this level, and heating it and then releasing it at the floor level 91 through the air outlets 66.

The water inlet 12 of the water reservoir 8 will have mounted thereon a pressure regulator 68, a check valve 70, and a stop and leak valve 72. The pressure regulator 68 is a safety feature to maintain a safe and desirable water pressure. The check valve 70 will prevent water from escaping from the storage tank back through the water supply line 26 or 46 in the event of a water outage. The stop and leak valve 72 will permit draining the storage tank in the event that it becomes necessary.

The water inside the water reservoir 8 is heated in several ways. Heat is obtained from the system through radiation and convection through the mouth of the fireplace in a conventional manner. Heat from combustion gases in the throat 6 of the firebox is passed directly upward into the water within the reservoir 8 by radiation, conduction and convection. Heat passing through the central passage 16 is absorbed by radiation, conduction, and convection through the heat exchanger elements 20. This heat is generally lost in conventional fireplace heating systems but is efficiently extracted by the invention disclosed herein. And heat is obtained through radiation and conduction through the air grate 56 and second plenum 50.

The water reservoir 8 is insulated with insulation 74 to prevent radiation of the heat stored in the water in the reservoir 8 to the ambient. The insulation permits the water stored in the reservoir 8 to retain the heat therein for substantial periods of time after fire has been extinguished in the fireplace 2.

Another feature is that water will be available for household use in the event of a water outage. An air valve 76 at the top of the reservoir 8 prevents a vacuum from forming inside the storage tank as water is withdrawn through the outlet 28 or the stop and leak valve 72. The reservoir 8 also has a pop-off valve 78 to release steam pressure if overheating of the water should occur.

A sheet metal shield 80 encloses the insulation 74 surrounding the reservoir 8 and firebox 2 giving the entire unit a "zero-clearance" installation so that the system may be installed near combustable structural elements without violating building code provisions.

In the frontal view of this system shown in FIG. 1, the glass doors 82 may be sealed with an asbestos seal and may employ sliding draft regulators 84 in each of the glass doors 82 to increase the efficiency of the unit by enabling the operator to control the size of the fire and also to extinguish the fire by regulating or cutting off the air supply into the firebox 2.

When the heat sink 40 is a bulk of subterranean soil within which the coil 38 are buried, the coils must be buried at a depth at which a stable soil temperature is maintained.

Although a specific embodiment of the invention has been disclosed in the figures and specification, it should be understood by those skilled in the art that changes can be made in the form and details of the invention disclosed without departing from the spirit and scope of the invention.

I claim:

1. A fireplace heating and cooling system, comprising:
   a firebox having a mouth for the introduction of fuel and a throat for the exhaustion of combustion gases;
   a water reservoir mounted on top of said firebox having an external wall through which is mounted a water inlet and a water outlet, and having a central passage formed by an interior wall of said reservoir, communicating with said throat, with first heat exchanging elements mounted on said interior wall within said central passage for absorbing heat from said combustion gases and second heat exchanging elements mounted on said interior wall within said reservoir for transferring said absorbed heat to the water stored in said reservoir;
   a valve means connected to said water inlet and water outlet, having a first position connecting said water inlet to a pressurized water supply and said water outlet to a hot water outlet;
   said water reservoir having third heat exchanging elements mounted on the outside surface of the external wall of said reservoir;
   an air plenum formed around said external wall of said reservoir having an air inlet and an air outlet mounted therein and connected to a space whose temperature is to be maintained, for conducting air across said third heat exchanging elements, to transfer heat between said water and said air;
   a fourth heat exchanging element connected to a heat sink, through which water is circulated by means of a pump, having a water inlet and a water outlet;
   said valve means having a second position connecting said water inlet of said water reservoir to said water outlet of said fourth heat exchanging element and connecting said water outlet of said water reservoir to said water inlet of said fourth heat exchanging element;
   said air being warmed in said plenum for heating said space and said pressurized water being warmed in said reservoir with said valve means in said first position, for supplying hot water, after combustion has occurred in said firebox;

said air being cooled in said plenum for cooling said space, with said valve means in said second position, when no combustion has occurred in said firebox.

2. The system of claim 1, wherein said air inlet and air outlet of said plenum is connected to a forced air central heating system.

3. The system of claim 1, which further comprises:
a second plenum surrounding said firebox having an air inlet connected to the ambient and an air outlet;
an air grate in the mouth of said firebox having an air inlet connected to said air outlet of said firebox plenum and an air outlet connected to the ambient; whereby the air in the ambient may be heated.

4. The system of claim 1, wherein said hot water is used as hot tap water.

5. The system of claim 1, wherein said hot water is passed through a radiator to heat the ambient.

6. The system of claim 1, wherein said heat sink is a bulk of subterranean soil.

7. The system of claim 1, wherein said heat sink is a water well.

8. The system of claim 3, wherein said air inlet of said second plenum and said air outlet of said air grate are connected to said plenum formed around said external wall of said reservoir to further heat the air therein.

* * * * *